(12) United States Patent
Smetana et al.

(10) Patent No.: US 7,527,584 B2
(45) Date of Patent: May 5, 2009

(54) BELT-TENSIONING ROLLER

(75) Inventors: Tomas Smetana, Erlangen (DE); Rainer Schenk, Furth (DE)

(73) Assignee: Ina-Schaeffler KG (DE)

( * ) Notice: Subject to any disclaimer, the term of this patent is extended or adjusted under 35 U.S.C. 154(b) by 325 days.

(21) Appl. No.: 10/801,415

(22) Filed: Mar. 15, 2004

(65) Prior Publication Data
US 2004/0192527 A1  Sep. 30, 2004

(30) Foreign Application Priority Data
Mar. 15, 2003  (DE)  ................ 103 11 474

(51) Int. Cl.
*F16C 13/00*  (2006.01)

(52) U.S. Cl. ............... 492/54; 29/522.1; 29/523; 29/525

(58) Field of Classification Search .............. 29/507, 29/506, 522.1, 523, 898.059, 898.051, 520, 29/516, 508, 898.058; 384/279, 276; 792/54; 492/54
See application file for complete search history.

(56) References Cited

U.S. PATENT DOCUMENTS

| | | | | |
|---|---|---|---|---|
| 1,441,459 A | * | 1/1923 | Small | 138/151 |
| 1,643,977 A | * | 10/1927 | Buckwalter | 29/505 |
| 1,839,964 A | * | 1/1932 | Harvey | 384/276 |
| 3,023,495 A | * | 3/1962 | Noland | 29/421.1 |
| 3,653,109 A | * | 4/1972 | Timmermans | 29/898.059 |
| 4,125,924 A | * | 11/1978 | Goetze et al. | 29/895.21 |
| RE30,802 E | * | 11/1981 | Rogers, Jr. | 29/421.1 |
| 5,787,933 A | * | 8/1998 | Russ et al. | 138/98 |
| 6,120,045 A | | 9/2000 | Rosko | |
| 6,267,712 B1 | * | 7/2001 | Franke | 492/16 |
| 6,942,558 B2 | | 9/2005 | Wuensch | |

FOREIGN PATENT DOCUMENTS

| | | |
|---|---|---|
| DE | 0 152 972 | 12/1981 |
| DE | 37 42 480 A1 | 6/1989 |
| DE | 42 30 966 A1 | 3/1994 |
| DE | 195 25 965 A1 | 1/1997 |
| DE | 197 03 821 A1 | 8/1998 |
| DE | 197 18 307 A1 | 11/1998 |

OTHER PUBLICATIONS

Lionel S. Marks, Ed., *Mechanical Engineers' Handbook*, Fifth Edition, McGraw-Hill Book Company, Inc., 1951, pp. 902-903.

* cited by examiner

*Primary Examiner*—David P Bryant
*Assistant Examiner*—Sarang Afzali
(74) *Attorney, Agent, or Firm*—Ostrolenk, Faber, Gerb & Soften, LLP

(57) ABSTRACT

Subassembly of at least two machine parts, the outer machine part, in particular a tensioning roller with a running disk made of steel being fastened with its internal circumferential surface on an external circumferential surface of the inner machine part a raceway ring of a rolling bearing, by means of compression connection, wherein the overlap of the internal diameter of the outer machine part, in particular the running disk, and of the external diameter of the inner machine part, in particular raceway ring, and the dimensions of the machine parts and their materials are selected such that the outer machine part, in particular the running disk, is deformed into the plastic range of material strain.

4 Claims, 1 Drawing Sheet

BELT-TENSIONING ROLLER

FIELD OF THE INVENTION

The invention concerns a subassembly comprised of at least two machine parts, the outer machine part being fastened with its internal circumferential surface on an external circumferential surface of the inner machine part by means of a compression connection, in particular a connection between a tensioning roller with a running disk made of steel and a raceway ring of a rolling bearing.

BACKGROUND OF THE INVENTION

Owing to manufacturing-dependent dimensional spread and defects of form of the outer machine part, in particular of the running disk, a difference of up to 80 μm arises between the minimum and maximum overlap in the case of an internal diameter of the running disk of roughly 55 mm.

This results in considerable differences in the transmission capacity of the compression connection between the running disk and the raceway ring of the rolling bearing if, as is known, the deformation of the running disk lies in the elastic material range (the ratio between minimum and maximum pressing force is roughly 1:3). Especially in the case of minimum overlap, there is a risk of the running disk moving away from the raceway ring of the rolling bearing. This can lead to the total destruction of a motor vehicle engine if, for example, the tensioning roller is installed in the toothed-belt drive for driving a camshaft, or the like.

Moreover, different contractions of the raceway ring occur, so that, in order to meet the demands on the rolling bearing, allocation of the rolling elements after the running disk has been pressed onto the raceway ring is necessary. This of course leads to considerable costs.

Furthermore, an uneven deformation of the raceway of the raceway ring may appear as a result of the non-roundness of the running disk, which can lead to the rolling bearing generating noise.

It is known to carry out friction-increasing coating of the contact surface of one of the machine parts. Various coatings are known from patent publications DE 195 25 965 A1, DE 197 03 821 A1, DE 197 18 307 A1 and DD 0 152 972 C.

It is true that such coatings improve the transmission capacity of the compression connection. But, they lead to additional costs and additional expenditure of labor. Moreover, they do not solve the problem of different contraction and uneven deformation of the raceway ring.

OBJECT OF THE INVENTION

It is therefore an object of the invention to provide a subassembly which has improved transmission capacity of the compression connection and thus increased reliability and operational safety, in which uneven deformations of the inner machine part are avoided. As a result, running noise is reduced, and furthermore the costs and also the weight of the subassembly are reduced.

SUMMARY OF THE INVENTION

The object of the invention is achieved by the fact that the overlap of the outer machine part, in particular the running disk, and of the inner machine part, the raceway ring, and the dimensions of the machine parts and their materials are selected in such a way that the outer machine part, in particular the running disk, is deformed into the plastic range of material strain.

Standard steels, in particular St4, from which the outer machine part, in particular the running disk, is preferably manufactured, have in the plastic range a virtually linearly hardening behavior with a breaking elongation of more than 10%. It emerges from the stress-strain characteristic that a flat curve shape of the plastic range follows subsequent to the elastic deformation with a relatively steep curve shape, so that the joint pressure changes only relatively little in relation to the overlap. This also cause a relatively small change in the contraction of the raceway of the rolling bearing. In this connection, the maximum strain in the outer machine part, that is in the running disk, still lies below the breaking elongation, so that there is no danger of cracking of the running disk.

For the above reasons, such a compression connection is considerably less susceptible to dimensional spreads and defects of form, producing a considerably greater transmission capacity of the compression connection. Furthermore, the contraction of the inner machine part, that is the raceway ring, is virtually independent of the dimensional spread of the outer machine part, that is the running disk, so that allocation of the rolling elements of the rolling bearing can be dispensed with. Finally, the form variations also balance one another out by virtue of the plastic state, so that no uneven raceway deformation takes place in the axial direction or the circumferential direction.

With unchanged dimensions of the machine parts, however, the invention leads to the contraction of the inner machine part, namely the raceway ring, being greater than if the running disk were deformed only in the elastic range. However, this can be remedied by a special bearing which has greater bearing play in the uncontracted state of the bearing outer ring.

In a further development of the invention, it is proposed that the wall thickness of the outer machine part, that is the running disk, be selected such that the contraction of the inner machine part, the raceway ring, corresponds to a level which corresponds in the case of maximum overlap of the compression connection in the case of elastic deformation of the outer machine part, to the running disk. This can be effected by, for example, the wall thickness of the running disk being reduced from 2 mm to 1.5 mm in the case of an external diameter of the raceway ring of roughly 55 mm. This measure results in the running disk already being plastically deformed at low overlap, so that the contraction of the raceway ring becomes correspondingly smaller. Therefore, no special bearing is necessary.

Other features and advantages of the present invention will become apparent from the following description of the invention which refers to the accompanying drawings.

BRIEF DESCRIPTION OF THE DRAWINGS

For further explanation of the invention, reference is made to the drawings, in which illustrative embodiments of the invention are shown in simplified form and.

DESCRIPTION OF A PREFERRED EMBODIMENT OF THE INVENTION

Figure 1:
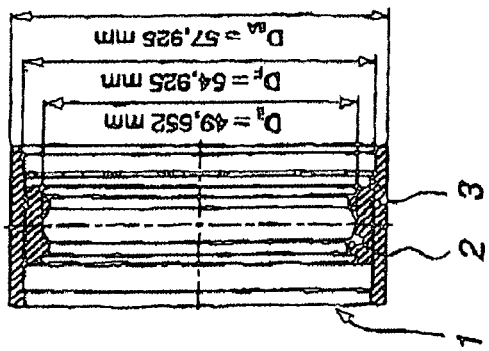
FIG. 1 shows a longitudinal section through a running disk and a raceway ring of a tensioning roller.

In FIG. 1, reference number 1 designates a part of a tensioning roller which has a raceway ring 2 and a running disk 3 on a common axis. As can be seen from the dimensions, the running disk 3 has a wall thickness of 1.5 mm between its external and internal circumferences, so that the subassembly has an external diameter of roughly 58 mm in the case of an external diameter of the raceway ring 2 of roughly 55 mm. The raceway ring 2 is of thicker construction than the running disk 3. It has a minimum wall thickness between its external and internal circumferences of roughly 2.5 mm. The compression connection is executed in such a way that the running disk 3 has been deformed into the plastic range of material strain.

Figure 2:
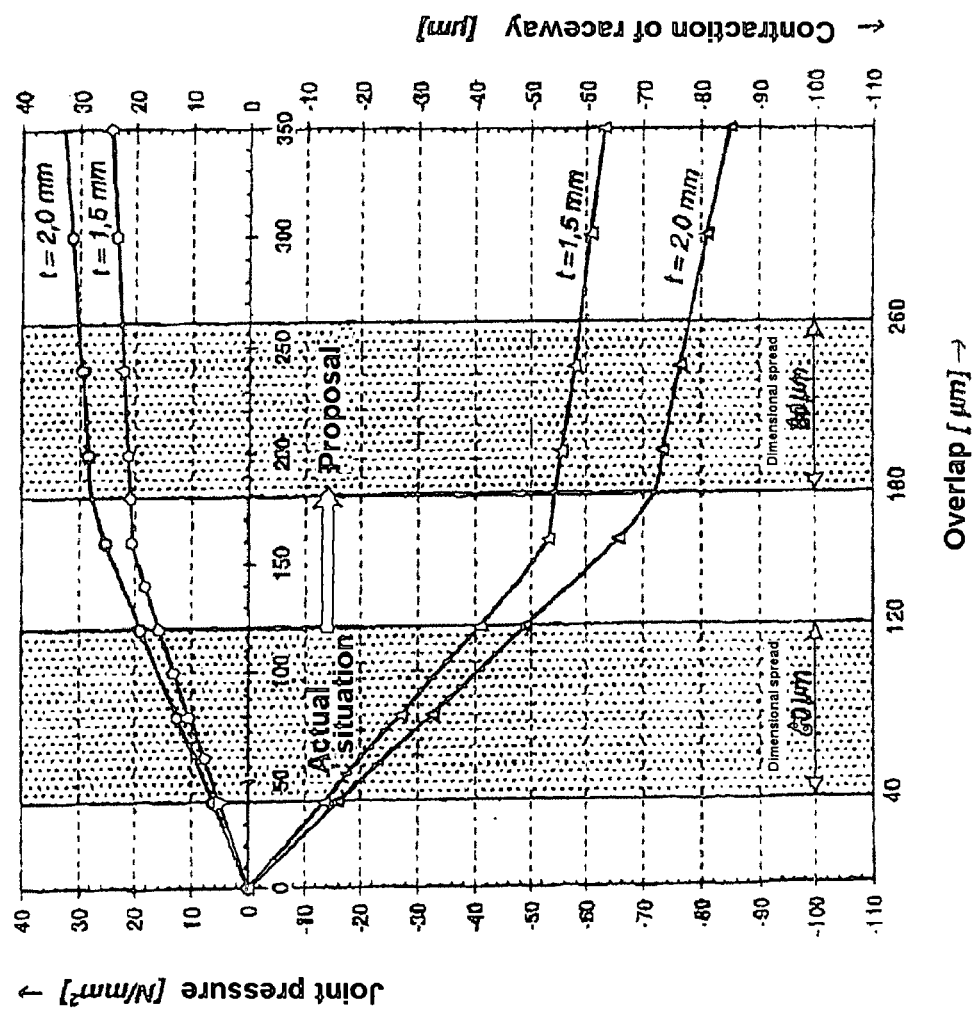
FIG. 2 shows a diagram in which the joint pressure, the overlap and the contraction of the raceway ring are illustrated.

In FIG. 2, the joint pressure and the contraction of the raceway ring 2 are illustrated as a function of the overlap. The contraction of the raceway ring 2 as a function of the overlap can be seen from the two lower curves, the curve t=2.0 mm indicating the wall thickness of 2 mm and the curve t=1.5 mm the wall thickness of 1.5 mm of the running disk 3.

It is clear that the dimensional spread of 80 µm mentioned in the general description in the case of an overlap from 40 to 120 µm and a deformation of the running disk 3 in the elastic range leads to a considerable change in the joint pressure, depending on wall thickness of the running disk 3, of from roughly 5 to 25 N/mm².

A dimensional spread of 80 µm in the range from 180 to 260 µm overlap and with a deformation of the running disk 3 into the plastic material range leads only to a joint pressure change from roughly 28 to 30 N/mm² with a wall thickness of the running disk 3 of 2 mm and 21 to 22 N/mm² with a wall thickness of 1.5 mm.

It is to be emphasized that in the case of deformation of the running disk 3 into the plastic range, a sufficient joint pressure is always present, which ensures secure retention of the running disk 3 on the raceway ring 2.

It can be seen from the lower curves in FIG. 2 that the variations in the contraction of the raceway ring 2 in the case of an overlap in the range from 180 to 260 µm and plastic deformation of the running disk 3 likewise undergo only small changes, so that, irrespective of the wall thickness of the running disk, no allocation of the rolling elements of the rolling bearing is necessary. With the stated dimensions of the subassembly according to FIG. 1 and a wall thickness of the running disk 3 of 2 mm, however, a contraction of the raceway ring 2 or of the raceway of the rolling element appears which makes a special bearing necessary.

With a wall thickness of the running disk 3 of 1.5 mm and otherwise unchanged dimensions, this is not necessary.

Although the present invention has been described in relation to particular embodiment thereof, many other variations and modifications and other uses will become apparent to those skilled in the art. It is preferred, therefore, that the present invention be limited not by the specific disclosure herein, but only by the appended claims.

What is claimed is:

1. A subassembly comprised of at least two machine parts including:

an outer machine part comprising a tensioning roller including a running disk made of steel, the outer machine part having an internal circumferential surface;

a cooperating inner machine part having an external circumferential surface, the inner machine part comprising a raceway ring of a rolling bearing with an internal circumference on which the raceway is defined, the internal circumferential surface of the outer machine part and the external circumferential surface of the inner machine part being fastened one over the other by means of compression connection;

the outer and inner machine parts being so positioned along an axis with respect to each other that the dimensions of the inner and outer machine parts radially overlap;

the respective materials of the inner machine part and the outer machine part are selected such that the outer machine part is deformed radially outward into the plastic range of material strain, and the inner machine part is subject to a contraction, wherein the wall thickness of the outer machine is selected such that the contraction of the inner machine part corresponds to an expected level of contraction induced by an outer machine part having a predetermined greater wall thickness, at maximum radial overlap of the compression connection, where the outer machine part of the predetermined wall thickness would remain within a range of elastic deformation.

2. The subassembly of claim 1, wherein the inner machine part has an external diameter of approximately 55 mm and the outer machine part has a wall around the inner machine part with a thickness of approximately 1.5 mm.

3. A subassembly comprised of at least two machine parts including:

an outer machine part comprising a tensioning roller including a running disk made of steel, the outer machine part having an internal circumferential surface;

a cooperating inner machine part having an external circumferential surface, the inner machine part comprising a raceway ring of a rolling bearing with an internal circumference on which the raceway is defined, the internal circumferential surface of the outer machine part and the external circumferential surface of the inner machine part being fastened one over the other by means of compression connection;

the outer and inner machine parts being so positioned along an axis with respect to each other that the dimensions of the inner and outer machine parts radially overlap;

the respective materials of the inner machine part and the outer machine part are selected such that the outer machine part is deformed radially outward into the plastic range of material strain, and the inner machine part is subject to a contraction, wherein the wall thickness of the running disk is selected such that the contraction of the raceway ring corresponds to an expected level of contraction induced by a running disk having a predetermined greater wall thickness, at maximum radial overlap of the compression connection, where the running disk of the predetermined wall thickness would remain within a range of elastic deformation.

4. The subassembly of claim 3, wherein the external diameter of the raceway ring at the external circumferential surface is approximately 55 mm and the running disk has a thickness between the external circumferential surface thereof and the raceway of approximately 1.5 mm.

* * * * *